(12) United States Patent
Okubo et al.

(10) Patent No.: US 9,031,012 B2
(45) Date of Patent: May 12, 2015

(54) RADIO BASE STATION

(75) Inventors: Naoto Okubo, Yokosuka (JP); Hiroyuki Ishii, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 658 days.

(21) Appl. No.: 13/128,135

(22) PCT Filed: Nov. 6, 2009

(86) PCT No.: PCT/JP2009/068956
§ 371 (c)(1),
(2), (4) Date: Jul. 11, 2011

(87) PCT Pub. No.: WO2010/053144
PCT Pub. Date: May 14, 2010

(65) Prior Publication Data
US 2011/0255494 A1    Oct. 20, 2011

(30) Foreign Application Priority Data

Nov. 7, 2008   (JP) ................ P2008-287102

(51) Int. Cl.
| | |
|---|---|
| H04L 1/00 | (2006.01) |
| H04L 1/18 | (2006.01) |
| H04L 5/00 | (2006.01) |
| H04W 24/10 | (2009.01) |
| H04W 88/08 | (2009.01) |

(52) U.S. Cl.
CPC ............ *H04L 1/0027* (2013.01); *H04L 5/0007* (2013.01); *H04L 5/0053* (2013.01); *H04L 5/006* (2013.01); *H04W 24/10* (2013.01); *H04W 88/08* (2013.01); *H04L 1/0026* (2013.01); *H04L 1/1854* (2013.01)

(58) Field of Classification Search
None
See application file for complete search history.

(56) References Cited

U.S. PATENT DOCUMENTS

| | | | |
|---|---|---|---|
| 2008/0273616 A1* | 11/2008 | Papasakellariou | ............ 375/260 |
| 2009/0103562 A1* | 4/2009 | Frederiksen et al. | ......... 370/468 |
| 2009/0154580 A1* | 6/2009 | Ahn et al. | ..................... 375/260 |
| 2010/0091724 A1 | 4/2010 | Ishii et al. | |
| 2010/0118995 A1 | 5/2010 | Fukui | |

FOREIGN PATENT DOCUMENTS

| | | |
|---|---|---|
| WO | 2008/105316 A1 | 9/2008 |
| WO | 2008/114541 A1 | 9/2008 |

OTHER PUBLICATIONS

Office Action for Japanese Application No. 2008-287102, mailed Dec. 11, 2012, with English translations thereof (5 pages).

(Continued)

*Primary Examiner* — Huy D Vu
*Assistant Examiner* — Teisha D Hall
(74) *Attorney, Agent, or Firm* — Osha Liang LLP

(57) ABSTRACT

A radio base station (eNB) according to the present invention includes: a determination unit (14) configured to determine an assignable OFDM symbol number indicating the number of OFDM symbols in each subcarrier assignable to a control channel in a downlink, in each subframe configured by a predetermined number of OFDM symbols, wherein the determination unit (14) is configured to calculate an OFDM symbol number corresponding to a communication status, in each subframe within a measurement interval, and to set a maximum number of the calculated OFDM symbol numbers to the assignable OFDM symbol number in each subframe within a next control interval that starts after completion of the measurement interval.

1 Claim, 6 Drawing Sheets

(56) References Cited

OTHER PUBLICATIONS

Office Action for Chinese Application No. 200980144427.6 dated May 2, 2013, with English translation thereof (8 pages).
Office Action in counterpart Chinese Patent Application No. 200980144427.6 dated Jan. 2, 2014 (8 pages).
3GPP TS 36.211 V10.1.0, Mar. 2011, 3rd Generation Partnership Project; Technical Specification Group Radio Access Network; Evolved Universal Terrestrial Radio Access (E-UTRA); Physical Channels and Modulation (Release 10), 104 pages.
International Search Report issued in PCT/JP2009/068956, mailed on Jan. 26, 2010, with translation, 3 pages.
Written Opinion issued in PCT/JP2009/068956, mailed on Jan. 26, 2010, 3 pages.
International Preliminary Report on Patentability issued in PCT/JP2009/068956, issued on May 10, 2011, 4 pages.
Office Action in counterpart Chinese Patent Application No. 200980144427.6, mailed Aug. 7, 2014 (9 pages).

* cited by examiner

FIG. 5

|  | OPTIMAL OFDM SYMBOL NUMBER |
|---|---|
| $N_{pdcch} < Th_{cfi,1\text{-}to\text{-}2}$ | 1 |
| $Th_{cfi,1\text{-}to\text{-}2} \leq N_{pdcch} < Th_{cfi,2\text{-}to\text{-}3}$ | 2 |
| $Th_{cfi,2\text{-}to\text{-}3} \leq N_{pdcch}$ | 3 |

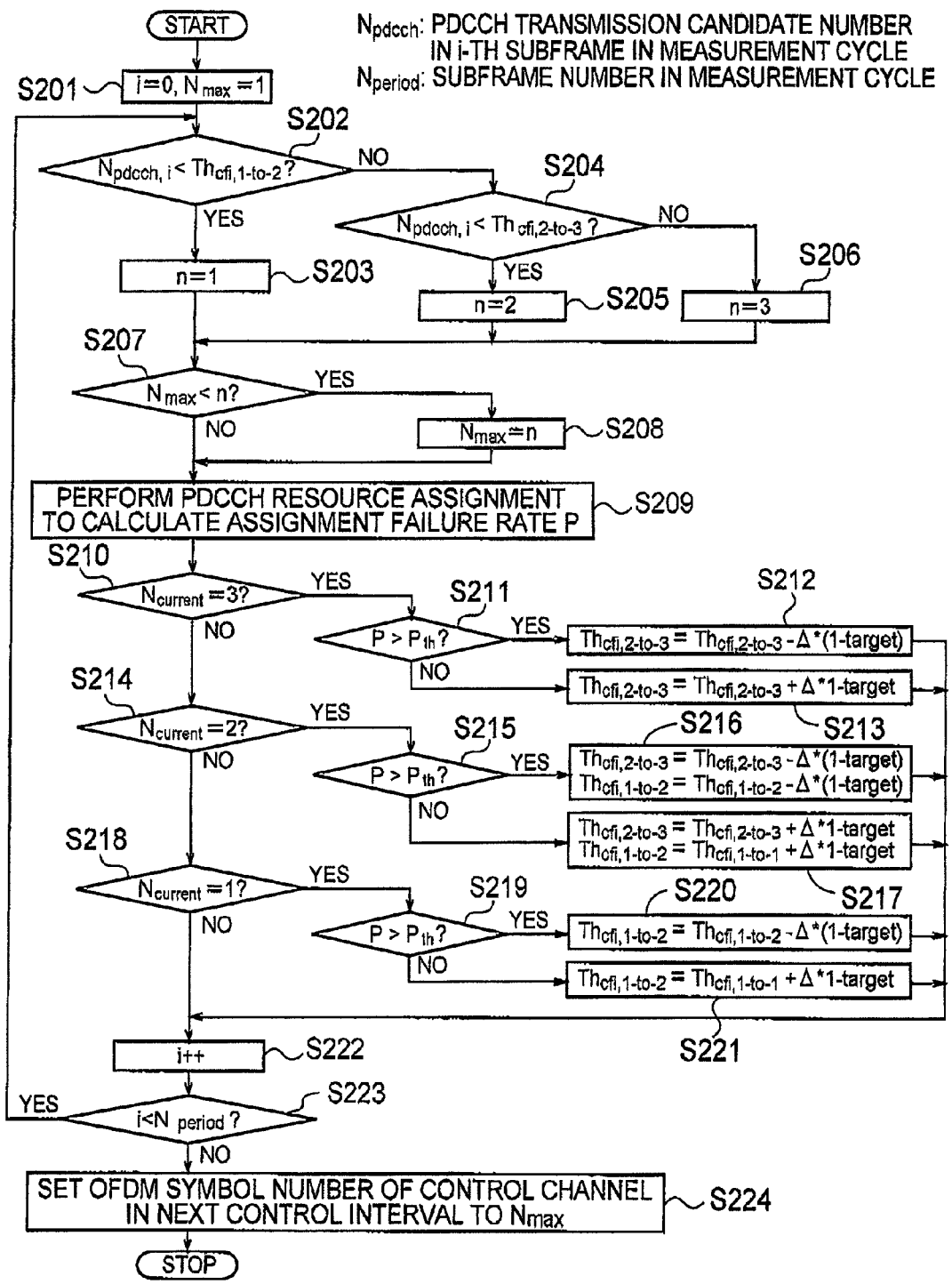

RADIO BASE STATION

TECHNICAL FIELD

The present invention relates to a radio base station.

BACKGROUND ART

In mobile communication systems of the LTE (Long Term Evolution) scheme being developed for standardization in the 3GPP, "CFI (Control Format Indicator)", "DCI (Downlink Control Information)", and "HI (HARQ Indicator)" are configured to be transmitted as control information in a downlink.

In this case, the CFI is information indicating an OFDM symbol number, of 14 OFDM symbols within one subframe, which is used in a control channel in a downlink.

Moreover, the DCI is control information (resource assignment information, a modulation method, etc.) necessary to transmit uplink data and downlink data. It is noted that there are two types of DCI, i.e., common DCI covering all mobile stations UE and specific DCI covering a specific mobile station UE (a specific mobile station UE or a mobile station UE in a specific group).

Moreover, the HI is transmission confirmation information (ACK/NACK) for the uplink data.

Further, in the mobile communication system of the LTE scheme, the CFI is configured to be transmitted via PCFICH (Physical Control Format Indicator Channel), the DCI is configured to be transmitted via PDCCH (Physical Downlink Control Channel), and the HI is configured to be transmitted via Physical hybrid-ARQ Indicator Channel.

SUMMARY OF THE INVENTION

Problems to be Solved by the Invention

The mobile communication system of the LTE scheme, however, has a problem that how a radio resource is assigned to the control channels (PCFICH, PDCCH, PHICH, etc.) in the above-mentioned downlink is not defined.

Therefore, the present invention is intended to overcome the above-described problem. An object of the present invention is to provide a radio base station capable of assigning an appropriate radio resource to a control channel in a downlink, in a high-speed mobile communication system like a mobile communication system of the LTE scheme.

Means for Solving the Problem

A first aspect of the present invention is summarized as a radio base station including: a determination unit configured to determine an assignable OFDM symbol number indicating the number of OFDM symbols in each subcarrier assignable to a control channel in a downlink, in each subframe configured by a predetermined number of OFDM symbols, wherein the determination unit is configured to calculate an OFDM symbol number corresponding to a communication status, in each subframe within a measurement interval, and to set a maximum number of the calculated OFDM symbol numbers to the assignable OFDM symbol number in each subframe within a next control interval that starts after completion of the measurement interval.

Effects of the Invention

As explained above, according to the present invention, it is possible to provide a radio base station capable of assigning an appropriate radio resource to a control channel in a downlink, in a high-speed mobile communication system like a mobile communication system of an LTE scheme.

BRIEF DESCRIPTION OF THE DRAWINGS

FIG. 5 is a table illustrating a method of controlling the OFDM symbol number, in the mobile communication system according to the first embodiment of the present invention.

FIG. 7 is a flowchart explaining the method of controlling the OFDM symbol number, in the mobile communication system according to the first embodiment of the present invention.

BEST MODES FOR CARRYING OUT THE INVENTION

Configuration of Mobile Communication System According to First Embodiment of the Present Invention With reference to FIG. 1 to FIG. 5, the configuration of a mobile communication system according to a first embodiment of the present invention will be explained.

Figure 1:
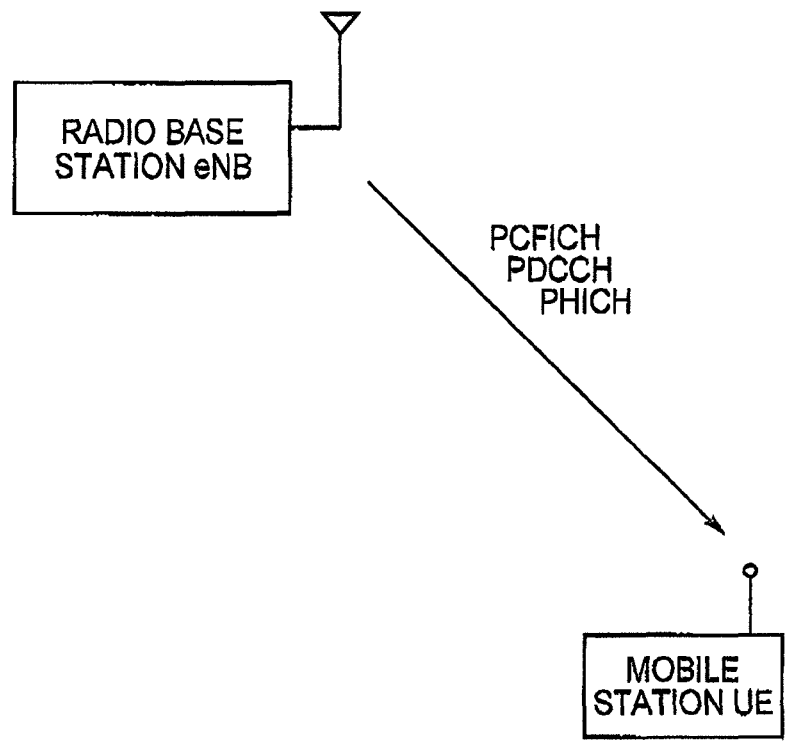
FIG. 1 is a diagram showing the entire configuration of a mobile communication system according to a first embodiment of the present invention.

The mobile communication system according to the embodiment is a mobile communication system of the LTE scheme, and includes: a radio base station eNB; and a mobile station UE. As illustrated in FIG. 1, in the mobile communication system according to the embodiment DCI, CFI, or HI as control information in a downlink is configured to be transmitted via PDCCH, PCFICH, or PHICH as a control channel in the downlink.

Figure 2:
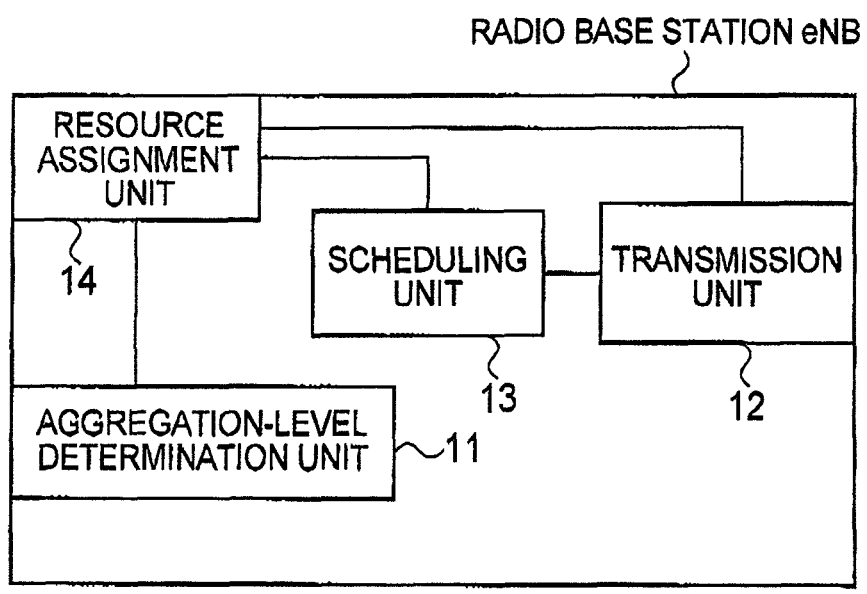
FIG. 2 is a functional block diagram of a radio base station according to the first embodiment of the present invention.

As illustrated in FIG. 2, the radio base station eNB according to the embodiment includes: an Aggregation-Level determination unit 11; a transmission unit 12; a scheduling unit 13; and a resource assignment unit 14.

The Aggregation-Level determination unit 11 is configured to determine a reception quality of a pilot signal in the downlink, notified from the mobile station UE, more specifically, "Aggregation Level" indicating the number of CCEs (Control Channel Elements) to be continuously assigned to PDCCH based on CQI (Channel Quality Indicator).

In this case, the control channel element is configured by nine continuous REGs (Resource Element Groups). Further, the resource element group is configured by four continuous REs (Resource Elements). Moreover, the resource element is configured by one OFDM symbol (time direction) and one subcarrier (frequency direction).

The transmission unit 12 is configured to transmit the control information in the downlink via the control channel in the downlink assigned by the resource assignment unit 14, in response to a scheduling result performed by the scheduling unit 13.

Moreover, the transmission unit 12 is configured to transmit downlink data via downlink data channel PDSCH (Physical Downlink Shared Channel) assigned by the resource assignment unit 14, in response to the scheduling result performed by the scheduling unit 13.

The scheduling unit 13 is configured to perform a scheduling process on the mobile station in which the downlink data that should be transmitted is present.

The resource assignment unit 14 is configured to assign a radio resource to the control channel or PDSCH in the downlink, in response to the scheduling result performed by the scheduling unit 13.

Specifically, the resource assignment unit 14 is configured to assign the resource element to PDSCH in units of RB (Resource Block).

In this case, the resource block is configured by seven OFDM symbols (time direction) and twelve subcarriers (frequency direction).

Moreover, the resource assignment unit 14 is configured to assign the resource element to the control channel in the downlink other than PDCCH, in units of resource element group.

It is noted that the resource assignment unit 14 is configured to assign the resource element to PDCCH in units of control channel element.

Further, the resource assignment unit 14 is configured to determine, by each subframe configured by a predetermined number (specifically, 14) of OFDM symbols, an assignable OFDM symbol number indicating the number of OFDM symbols in each subcarrier, assignable to the control channel (for example, PDCCH, PCFICH, or PHICH) in the downlink.

The assignable OFDM symbol number is configured to be transmitted, as CFI, by the transmission unit 12 via PCFICH.

Figure 3:
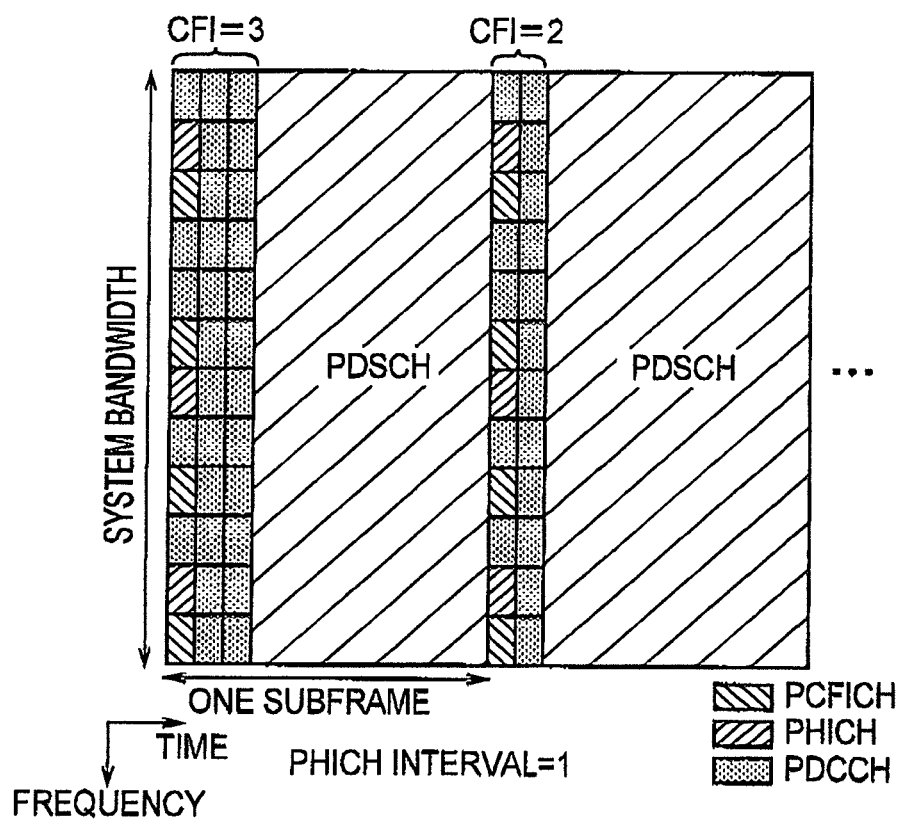
FIG. 3 is a diagram explaining a frame structure for a downlink, used in the mobile communication system according to the first embodiment of the present invention.

For example, as illustrated in FIG. 3, the number of OFDM symbols in each subcarrier assignable to the control channel in the downlink is variable, and may be any one of one to four.

Figure 4:
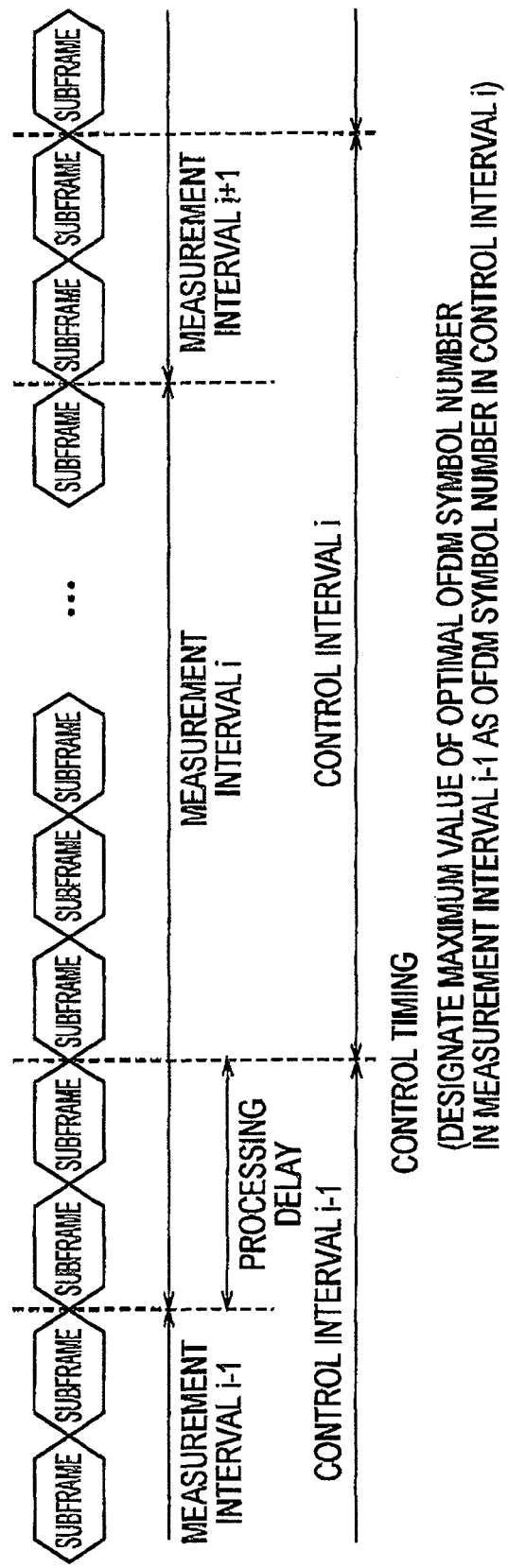
FIG. 4 is a diagram illustrating a control interval of an OFDM symbol number, in the mobile communication system according to the first embodiment of the present invention.

Specifically, as illustrated in FIG. 4, the resource assignment unit 14 is configured to calculate an OFDM symbol number corresponding to a communication status (optimal OFDM symbol number) in each subframe in a measurement interval, and to designate a maximum number of the calculated OFDM symbol numbers as an assignable OFDM symbol number in each subframe in a next control interval that starts after the completion of the measurement interval.

For example, in FIG. 4, the resource assignment unit 14 is configured to calculate, in each subframe in a measurement interval i−1, an OFDM symbol number corresponding to a communication status (optimal OFDM symbol number), and to designate a maximum number of the calculated OFDM symbol numbers, as an assignable OFDM symbol number in each subframe in a next control interval i that starts after the completion of the measurement interval i−1.

In this case, the measurement interval may include a plurality of subframes or one subframe only.

Moreover, the above-mentioned communication status may be the number of PDCCHs to be transmitted; a total number of "Aggregation Levels" determined based on CQI notified from the mobile station UE; the number of mobile stations UE subject to scheduling; or the number of mobile stations UE in which the downlink data that should be transmitted is present.

For example, the resource assignment unit 14 is configured to manage a table as illustrated in FIG. 5, and is configured to calculate the OFDM symbol number (optimal OFDM symbol number) corresponding to $N_{pdcch}$ (communication status), the number of PDCCHs to be transmitted.

Specifically, with reference to a table as illustrated in FIG. 5, the resource assignment unit 14 may be configured to set the optimal OFDM symbol number to "1", when $N_{pdcch}$, the number of PDCCHs to be transmitted, is smaller than a threshold value $Th_{cfi,1-to-2}$.

Moreover, with reference to a table as illustrated in FIG. 5, the resource assignment unit 14 may be configured to set the optimal OFDM symbol number to "2", when $N_{pdcch}$, the number of PDCCHs to be transmitted, is equal to or more than a threshold value $Th_{cfi,2-to-2}$ and smaller than a threshold value $Th_{cfi,2-to-3}$.

Further, with reference to a table as illustrated in FIG. 5, the resource assignment unit 14 may be configured to set the optimal OFDM symbol number to "3", when $N_{pdcch}$, the number of PDCCHs to be transmitted, is equal to more than a threshold value $Th_{cfi,2-to-3}$.

Moreover, the resource assignment unit 14 may be configured to modify a correspondence relationship between the above-mentioned communication status and the OFDM symbol number (for example, a content of the table as illustrated in FIG. 5), based on a predetermined factor.

Specifically, the resource assignment unit 14 may be configured to adaptively modify the threshold value or the optimal OFDM symbol number on the table as illustrated in FIG. 5, depending on a change of a situation of a propagation path, for example.

For example, the resource assignment unit 14 may be configured to decrease the above-mentioned threshold value, when assignment of the radio resource to the control channel in the downlink is failed.

It is noted that on the table illustrated in FIG. 5, instead of the number of PDCCHs to be transmitted, a total number of "Aggregation Levels", the number of mobile stations UE subject to scheduling, the number of mobile stations UE in which the downlink data that should be transmitted is present, or any other like number may be used.

(Operation of the Mobile Communication System According to the First Embodiment of the Present Invention)

Figure 6:
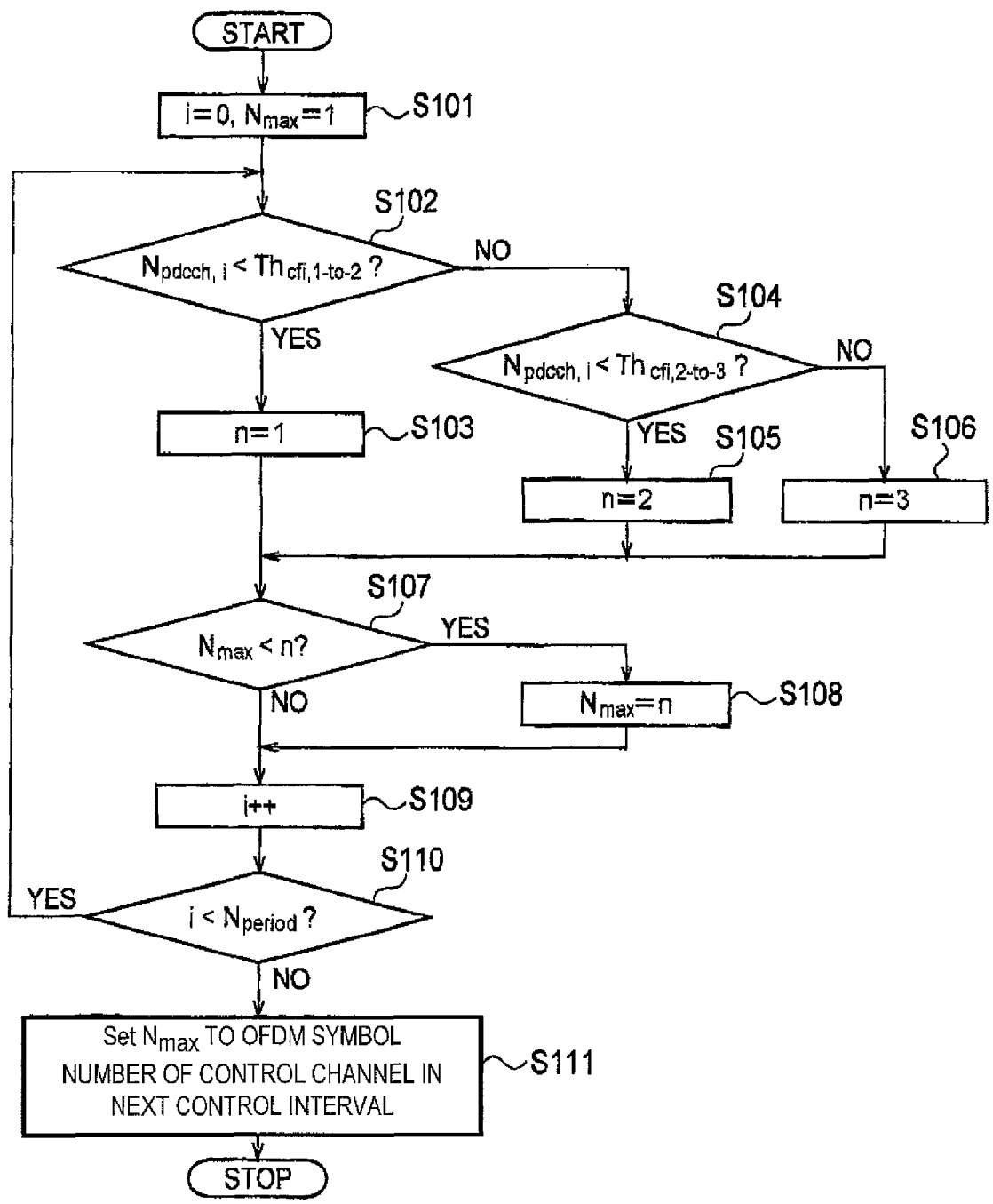
FIG. 6 is a flowchart explaining the method of controlling the OFDM symbol number, in the mobile communication system according to the first embodiment of the present invention.

With reference to FIG. 6 and FIG. 7, the operation of the mobile communication system according to the first embodiment of the present invention will be explained. In an example of FIG. 6 and FIG. 7, a case where $N_{pdcch}$, the number of PDCCHs to be transmitted, is used as the communication status is explained; however, the present invention can be applied also to a case where as the communication status, a total number of "Aggregation Levels", the number of mobile stations UE subject to scheduling, and the number of mobile stations UE in which the downlink data that should be transmitted is present, for example, are used.

Firstly, with reference to FIG. 6, a first operation example of the radio base station eNB in the mobile communication system according to the first embodiment of the present invention will be explained.

As illustrated in FIG. 6, in step S101, the radio base station eNB sets "i=0" and "$N_{max}$=1".

In step S102, the radio base station eNB determines whether or not $N_{pdcch,i}$ is smaller than the threshold value $Th_{cfi,1-to-2}$. In this case, $N_{pdcch,i}$ is the number of PDCCHs to be transmitted (PDCCH transmission candidate number) in an i-th subframe in a measurement cycle.

When it is determined that $N_{pdcch,i}$ is smaller than the threshold value $Th_{cfi,1\text{-}to\text{-}2}$, then the present operation proceeds to step S103, and otherwise, the present operation proceeds to step S104.

In step S103, the radio base station eNB sets "n=1".

In step S104, the radio base station eNB determines whether or not $N_{pdcch,i}$ is smaller than the threshold value $Th_{cfi,2\text{-}to\text{-}3}$.

When it is determined that $N_{pdcch,i}$ is smaller than the threshold value $Th_{cfi,2\text{-}to\text{-}3}$, then the present operation proceeds to step S105, and otherwise, the present operation proceeds to step S106.

In step S105, the radio base station eNB sets "n=2", and in step S106, the radio base station eNB sets "n=3".

In step S107, the radio base station eNB determines whether or not "$N_{max}<n$" can be satisfied.

When it is determined that "$N_{max}<n$" can be satisfied, the radio base station eNB sets "$N_{max}=n$" in step S108.

In step S109, the radio base station eNB increases "i" by "3."

In step S110, the radio base station eNB determines whether or not "$i<N_{period}$" can be satisfied. In this case, "$N_{period}$" is a subframe number in the measurement cycle.

When it is determined that "$i<N_{period}$" can be satisfied, the present operation returns to step S102, and when it is determined that "$i<N_{period}$" cannot be satisfied, the present operation proceeds to step S111.

In step S111, the radio base station eNB sets the assignable OFDM number in the next control interval, to "$N_{max}$".

Secondly, with reference to FIG. 7, a second operation example of the radio base station eNB in the mobile communication system according to the first embodiment of the present invention will be explained.

As illustrated in FIG. 7, in step S201, the radio base station eNB sets "i=0" and "$N_{max}=1$".

In step S202, the radio base station eNB determines whether or not $N_{pdcch,i}$ is smaller than the threshold value $Th_{cfi,1\text{-}to\text{-}2}$. In this case, $N_{pdcch,i}$ is the number of PDCCHs to be transmitted (PDCCH transmission candidate number) in an i-th subframe in a measurement cycle.

When it is determined that $N_{pdcch,i}$ is smaller than the threshold value $Th_{cfi,1\text{-}to\text{-}2}$ then the present operation proceeds to step S203, and otherwise, the present operation proceeds to step S204.

In step S203, the radio base station eNB sets "n=1".

In step S204, the radio base station eNB determines whether or not $N_{pdcch,i}$ is smaller than the threshold value $Th_{cfi,2\text{-}to\text{-}3}$.

When it is determined that $N_{pdcch,i}$ is smaller than the threshold value $Th_{cfi,2\text{-}to\text{-}3}$, then the present operation proceeds to step S205, and otherwise, the present operation proceeds to step S206.

In step S205, the radio base station eNB sets "n=2", and in step S206, the radio base station eNB sets "n=3".

In step S207, the radio base station eNB determines whether or not "$N_{max}<n$" can be satisfied.

When it is determined that "$N_{max}<n$" can be satisfied, the radio base station eNB sets "$N_{max}=n$" in step S208.

In step S209, the radio base station eNB assigns the radio resource to PDCCH and calculates an assignment failure rate P.

In step S210, the radio base station eNB determines whether or not "$N_{current}=3$" can be satisfied. In this case, "$N_{current}$" is an assignable OFDM number in the current control interval.

When it is determined that "$N_{current}=3$" can be satisfied, the present operation proceeds to step S211, and when it is determined that "$N_{current}=3$" cannot be satisfied, the present operation proceeds to step S214.

In step S211, the radio base station eNB determines whether or not "$P>P_{th}$" can be satisfied. In this case, "$P_{th}$" is a threshold value to the assignment failure rate P.

When it is determined that "$P>P_{th}$" can be satisfied, the radio base station eNB sets "$Th_{cfi,2\text{-}to\text{-}3}=Th_{cfi,2\text{-}to\text{-}3}-\Delta\times(1\text{-target})$" in step S212. In this case, "$\Delta$" is a predetermined parameter, and "target" is a target value of the assignment failure rate P.

On the other hand, when it is determined that "$P>P_{th}$" cannot be satisfied, the radio base station eNB sets "$Th_{cfi,2\text{-}to\text{-}3}=Th_{cfi,2\text{-}to\text{-}3}+\Delta\times\text{target}$" in step S213.

In step S214, the radio base station eNB determines whether or not "$N_{current}=2$" can be satisfied.

When it is determined that "$N_{current}=2$" can be satisfied, the present operation proceeds to step S215, and when it is determined that "$N_{current}=2$" cannot be satisfied, the present operation proceeds to step S218.

In step S215, the radio base station eNB determines whether or not "$P>P_{th}$" can be satisfied.

When it is determined that "$P>P_{th}$" can be satisfied, the radio base station eNB sets "$Th_{cfi,2\text{-}to\text{-}3}=Th_{cfi,2\text{-}to\text{-}3}-\Delta\times(1\text{-target})$" and "$Th_{cfi,1\text{-}to\text{-}2}=Th_{cfi,1\text{-}to\text{-}2}-\Delta\times(1\text{-target})$" in step S216.

On the other hand, when it is determined that "$P>P_{th}$" cannot be satisfied, the radio base station eNB sets "$Th_{cfi,2\text{-}to\text{-}3}=Th_{cfi,2\text{-}to\text{-}3}+\Delta\times\text{target}$" and "$Th_{cfi,1\text{-}to\text{-}2}=Th_{cfi,1\text{-}to\text{-}2}+\Delta\times\text{target}$" in step S217.

In step S218, the radio base station eNB determines whether or not "$N_{current}=1$" can be satisfied.

When it is determined that "$N_{current}=1$" can be satisfied, the present operation proceeds to step S219, and when it is determined that "$N_{current}=1$" cannot be satisfied, the present operation proceeds to step S222.

In step S219, the radio base station eNB determines whether or not "$P>P_{th}$" can be satisfied.

When it is determined that "$P>P_{th}$" can be satisfied, the radio base station eNB sets "$Th_{cfi,1\text{-}to\text{-}2}=Th_{cfi,1\text{-}to\text{-}2}-\Delta\times(1\text{-target})$" in step S220.

On the other hand, when it is determined that "$P>P_{th}$" cannot be satisfied, the radio base station eNB sets "$Th_{cfi,1\text{-}to\text{-}2}=Th_{cfi,1\text{-}to\text{-}2}+\Delta\times\text{target}$" in step S221.

In step S222, the radio base station eNB increases "i" by "1". In step S223, the radio base station eNB determines whether or not "$i<N_{period}$" can be satisfied.

When it is determined that "$i<N_{period}$" can be satisfied, the present operation returns to step S202, and when it is determined that "$i<N_{period}$" cannot be satisfied, the present operation proceeds to step S224.

In step S224, the radio base station eNB sets the assignable OFDM number in the next control interval, to "$N_{max}$".

(Operation and Effect of the Mobile Communication System According to the First Embodiment of the Present Invention)

Based on the mobile communication system according to the first embodiment of the present invention, in each subframe in the measurement interval, the maximum number of the OFDM symbol numbers corresponding to the communication status is set to the assignable OFDM symbol number in each subframe in the next control interval that starts after the completion of the measurement interval, and thereby, in consideration of a process load and a process delay, the OFDM symbol number that can be assigned to the control channel in the downlink in each subframe can be determined.

Moreover, based on the mobile communication system according to the first embodiment of the present invention, the correspondence relationship between the communication status and the OFDM symbol number is adaptively controlled in accordance with a change in propagation path situation, for example, and thereby, the OFDM symbol number that can be assigned to the control channel in the downlink in each subframe can be optimized.

The above-mentioned aspects of the embodiments may be expressed as follows:

A first aspect of the embodiment is summarized to include a resource assignment unit 14 configured to determine an assignable OFDM symbol number indicating the number of OFDM symbols in each subcarrier assignable to a control channel in a downlink, in each subframe configured by 14 OFDM symbols, wherein the resource assignment unit 14 is configured to calculate the OFDM symbol number corresponding to a communication status, in each subframe in a measurement interval, and set a maximum number of the calculated OFDM symbol numbers to the assignable OFDM symbol number in each subframe in a next control interval that starts after completion of the measurement interval.

In the first aspect of the embodiment, the communication status may be the number of physical downlink control channels to be transmitted.

In the first aspect of the embodiment, the communication status may be a total number of "Aggregation Levels" determined based on CQI notified from a mobile station UE; the "Aggregation Level" may indicate the number by which control channel elements, each configured by nine continuous resource element groups, are continuously assigned; the resource element group may be configured by four continuous resource elements; and the resource element may be configured by one OFDM symbol in one subcarrier.

In the first aspect of the embodiment, the communication status may be the number of mobile stations subject to scheduling.

In the first aspect of the embodiment, the communication status may be the number of mobile stations in which downlink data that should be transmitted is present.

In the first aspect of the embodiment, the resource assignment unit 14 may be configured to modify the correspondence relationship between the communication status and the OFDM symbol number, based on a predetermined factor.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE and the radio base station eNB. As a discrete component, such a storing medium and processor may be arranged in the mobile station UE and the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station comprising:
a determination unit configured to determine an assignable OFDM symbol number indicating the number of OFDM symbols in each subcarrier assignable to a control channel in a downlink, in each subframe configured by a predetermined number of OFDM symbols, wherein
the determination unit is configured to calculate an OFDM symbol number corresponding to a communication status, in each subframe within a measurement interval, and to set a maximum number of the calculated OFDM symbol numbers to the assignable OFDM symbol number in each subframe within a next control interval that starts after completion of the measurement interval;
wherein the communication status is either the number of the physical downlink control channels to be transmitted or a total number of aggregation levels determined based on a reception quality notified from a mobile station;
the aggregation level indicates the number of control channel elements to be continuously assigned, each control channel element being configured by a plurality of continuous resource element groups;
the resource element group is configured by a plurality of continuous resource elements; and
the resource element is configured by one OFDM symbol in one subcarrier.

* * * * *